United States Patent
Morgan et al.

(10) Patent No.: US 10,012,447 B2
(45) Date of Patent: Jul. 3, 2018

(54) METHOD AND APPARATUS FOR STORING THERMAL ENERGY IN THERMAL MASSES FOR ELECTRICITY GENERATION

(75) Inventors: Robert Morgan, West Sussex (GB); Michael Dearman, Hertfordshire (GB)

(73) Assignee: Highview Enterprises Limited, London (GB)

(*) Notice: Subject to any disclaimer, the term of this patent is extended or adjusted under 35 U.S.C. 154(b) by 745 days.

(21) Appl. No.: 13/816,184

(22) PCT Filed: Aug. 12, 2011

(86) PCT No.: PCT/GB2011/001214
§ 371 (c)(1),
(2), (4) Date: May 17, 2013

(87) PCT Pub. No.: WO2012/020233
PCT Pub. Date: Feb. 16, 2012

(65) Prior Publication Data
US 2013/0240171 A1    Sep. 19, 2013

(30) Foreign Application Priority Data

Aug. 12, 2010    (GB) .................................... 1013578.8
Mar. 15, 2011    (GB) .................................... 1104387.4

(51) Int. Cl.
*F28D 17/00*    (2006.01)
*F28D 20/00*    (2006.01)
(Continued)

(52) U.S. Cl.
CPC ............. *F28D 17/00* (2013.01); *F28D 20/00* (2013.01); *F28D 20/0056* (2013.01);
(Continued)

(58) Field of Classification Search
CPC ..... Y02E 60/14; Y02E 60/142; Y02E 60/145; Y02E 60/147; F28D 20/021;
(Continued)

(56) References Cited

U.S. PATENT DOCUMENTS 4,418,683 A    12/1983    Friefeld
5,271,239 A *  12/1993    Rockenfeller ......... C09K 5/047
                                                            165/80.2

(Continued)

FOREIGN PATENT DOCUMENTS

EP    0006211 A1    1/1980
EP    0794395 A1    9/1997
(Continued)

OTHER PUBLICATIONS

Ismail et al.—Numerical and experimental study of spherical capsules packed bed latent heat storage system; K.A.R. Ismail *, J.R. Henriquez; accepted Jun. 25, 2002.*
(Continued)

*Primary Examiner* — Len Tran
*Assistant Examiner* — Gordon Jones
(74) *Attorney, Agent, or Firm* — Thomas B. Ryan, Patent Agent; Harter Secrest & Emery LLP

(57) ABSTRACT

Methods and apparatus for storing thermal energy are disclosed. The thermal energy may be hot or cold. The methods and apparatus allow the thermal store to be charged and discharged at different rates. The methods and apparatus also allow the thermal store to be charged and discharged with multiple and/or interrupted phases.

41 Claims, 10 Drawing Sheets

(51) Int. Cl.
*F28D 20/02* (2006.01)
*F28F 27/02* (2006.01)
*F28D 21/00* (2006.01)

(52) U.S. Cl.
CPC ......... *F28D 20/026* (2013.01); *F28D 20/028* (2013.01); *F28F 27/02* (2013.01); *F28D 2020/006* (2013.01); *F28D 2020/0082* (2013.01); *F28D 2021/0033* (2013.01); *Y02E 10/46* (2013.01); *Y02E 60/142* (2013.01); *Y02E 60/145* (2013.01)

(58) Field of Classification Search
CPC .... F28D 20/023; F28D 20/025; F28D 20/026; F28D 2020/0004; F28D 2020/0021; F28D 20/0056; F28D 2020/0078; F28D 2020/0082; F28D 17/00; F28D 20/00; F28D 20/028; F28F 27/02
See application file for complete search history.

(56) References Cited

U.S. PATENT DOCUMENTS

| | | | |
|---|---|---|---|
| 7,156,156 B2* | 1/2007 | Haller | F28D 1/0476 165/10 |
| 2007/0227146 A1* | 10/2007 | Seidel | F28D 20/0039 60/659 |
| 2008/0066736 A1 | 3/2008 | Zhu | |
| 2010/0089391 A1 | 4/2010 | Addle et al. | |
| 2010/0176602 A1* | 7/2010 | Shinnar | F03G 6/04 290/1 A |

FOREIGN PATENT DOCUMENTS

| | | | |
|---|---|---|---|
| EP | 2554804 A2 * | 2/2013 | ............... F01K 3/12 |
| ES | 2306628 A1 | 11/2008 | |
| JP | 58-165550 | 11/1983 | |
| WO | WO 2007096656 A1 * | 8/2007 | ........... F01D 15/005 |
| WO | WO 2009134760 A2 * | 11/2009 | ........... F28D 1/0478 |
| WO | 2012/020233 A2 | 2/2012 | |

OTHER PUBLICATIONS

Accessed: http://web.archive.org/web/20091229161409/http://www.eolss.net/ebooks/Sample%20Chapters/C08/E3-14-02-00.pdf;Storage of Thermal Energy;O. Ercan Ataer;waybackwhen machine saved Dec. 29, 2009: http://www.eolss.net/ebooks/sample%20chapters/c08/e3-14-02-00.pdf.*
EP 0006211 A1 machine translation.*
PCT International Search Report in corresponding International Application No. PCT/GB2011/001214 dated Jul. 2, 2012 (4 pages).
PCT Written Opinion of the International Searching Authority in corresponding International Application No. PCT/GB2011/001214, dated Jul. 2, 2012 (6 pages).
Chen et al: "Progress in electrical energy storage system: A critical review" (pp. 291-312) Progress in National Science, Science Press, Beijing, CN, vol. 19, No. 3, dated Mar. 10, 2009.

* cited by examiner

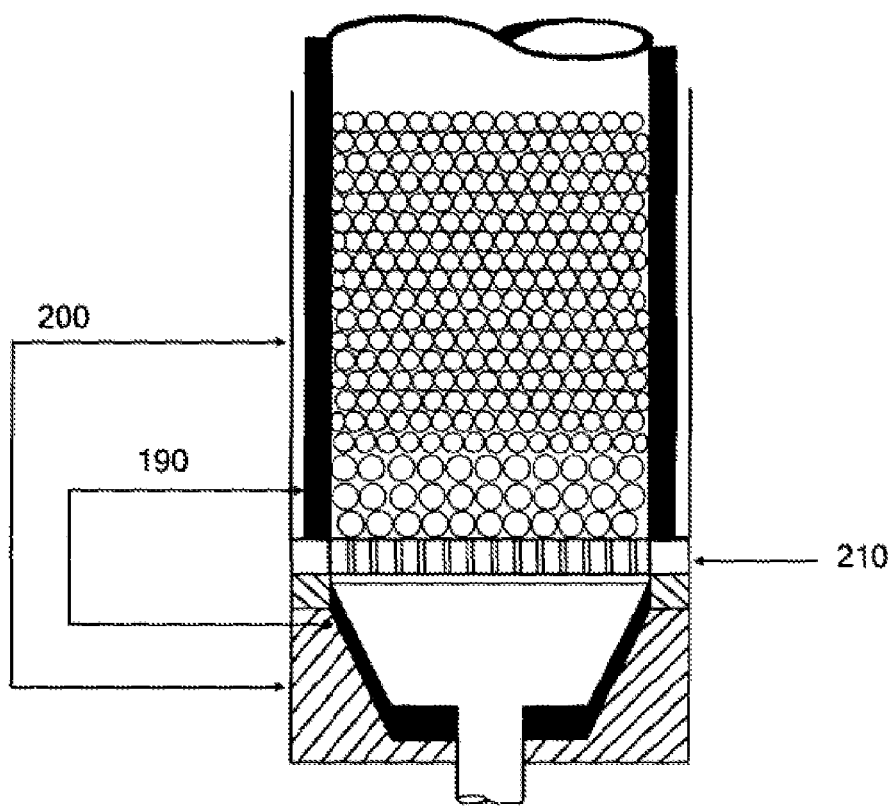

METHOD AND APPARATUS FOR STORING THERMAL ENERGY IN THERMAL MASSES FOR ELECTRICITY GENERATION

FIELD OF THE INVENTION

The present invention relates to methods and apparatus for storing thermal energy.

BACKGROUND OF THE INVENTION

Thermal energy storage devices (or thermal stores) are used to receive and then store heat, cold, or thermal energy for a period of time until it is needed for a useful purpose. Such thermal storage devices allow high or low (including cryogenic) temperature energy to be temporarily stored for later use, and offer the possibility of storing thermal energy, for example, for later conversion to electricity, for use in an air liquefaction process to reduce the energy consumed by the process, or to provide cooling for co-located processes. It is known to store thermal energy by increasing or decreasing the temperature of a substance, by changing the state (i.e. solid, liquid, or gas) of a substance, or by a combination of the two.

A thermal store typically operates on a three phase thermal storage process: charge, store and discharge. FIG. 1 shows a representation of a generic thermal store. The store includes a thermal mass 10, passages 20, surface features 30, an inlet 40 and an outlet 50. In a charge phase a heat transfer fluid (liquid or gas), hereinafter referred to as HTF, is passed through the inlet 40, into the passages 20, and out of the outlet 50, to either heat or cool the thermal mass 10. In a storage phase the thermal energy is then stored in the thermal mass 10 until required. In a discharge phase, the HTF is passed through the inlet 40, into the passages 20, and out of the outlet 50, over the thermal mass 10 to recover the thermal energy for transfer to another process. The thermal mass 10 includes surface features 30 to promote heat transfer. In known thermal stores the charge and discharge phases are symmetric, i.e. the HTF flow rates are the same during the charge and discharge phases.

One application in which such thermal stores are used is in the field of storing energy for generating electricity. An effective means of storing energy on a large scale is required to balance consumer demand for electricity with generating capacity, and to smooth out levels of intermittent supply from, for example, renewable energy sources. Energy demands vary on hourly, daily, weekly and seasonal bases. Alternative solutions for balancing supply and demand other than using traditional fossil fuel plants are now recognised as important to help control greenhouse gas emissions.

WO 2007/096656 discloses a cryogenic energy storage system which exploits the temperature and phase differential between low temperature liquid air and ambient air, or waste heat, to store energy at periods of low demand and/or excess production, allowing this stored energy to be released later to generate electricity during periods of high demand and/or constrained output. The system comprises a means for liquefying air during periods of low electricity demand, a means for storing the liquid air produced and an expansion turbine for expanding the liquid air. The expansion turbine is connected to a generator to generate electricity when required to meet shortfalls between supply and demand.

A major constraint to the efficiency of such cryogenic energy storage systems is the amount of cold energy remaining in the process air exhausted from the expansion turbine following expansion. The combination of cryogenic power storage and thermal energy storage provide a means of matching the electricity supply to meet variations in supply and demand. In particular, a thermal store can be used with a cryogenic energy storage system to recover and store the cold energy released when the cryogenic energy store is generating power and release the cold energy to reduce the energy cost of manufacturing cryogenic fluid when recharging the cryogenic energy storage system. FIG. 2 shows an example of a cryogenic energy storage system including an air liquefier module 60, a cryogenic liquid store 70, a cryogenic power recovery module 80, and a thermal store 90. FIG. 2 shows that there is a need for thermal storage because of the required time shifting between the generation of electricity and the need to generate further cryogen.

Therefore, there is a need for an efficient cold energy thermal store which facilitates the recovery of cold energy from exhaust gas, and which allows cold energy to be stored as high grade cold, to maximise the energy efficiency of the later recovery for use during the liquefaction phase, facilitating the production of more cryogen, and/or to provide cooling for co-located processes.

When a thermal store is used to store cold energy in a cryogenic energy storage system, the discharging phase and charging phase of the thermal store may be of different durations. In particular, the discharging phase is typically four or more times longer than the charging phase. Because of the mismatch between the periods of high and low demand and the different duration charging and discharging phases, there is a need for a flexible thermal storage system that can be charged and discharged at different rates. The need for such a thermal storage system presents a generic need for a thermal store in which the heat recovery, HTF pressure loss, and storage capacity can be optimised for an 'asymmetric' operating regime, i.e. a regime in which the charging and discharging of the thermal store are not carried out at the same HTF flow rates.

These needs also apply to systems in which thermal energy is stored as heat. Therefore, there is a need for an efficient thermal store which facilitates the recovery of heat, cold or thermal energy with high energy efficiency from exhaust gas.

Theory of Packed Bed Thermal Storage

The inventors have realised that it is important to optimise the design of the interface between the HTF and the thermal mass to ensure there is good transfer of heat from the HTF to the thermal store at a low pressure drop. In general it is desirable to provide a solid thermal mass having a large surface area, and features to break up the thermal boundary layer at the HTF-solid interface, in order to promote optimum heat transfer. However, such features increase the friction between the solid thermal mass and the HTF and hence increase pressure losses in the HTF generated across the thermal store.

In the case of a packed bed of particles, the relationship between fluid flow rate and pressure loss per unit length has been described by Ergun as:

$$\frac{\Delta P}{L} = \frac{150 \, \mu u (1-\varepsilon)^2}{D_p^2 \varepsilon^3} + \frac{1.75 \, \rho u^2 (1-\varepsilon)}{D_p \varepsilon^3} \tag{1}$$

where:
$\Delta P/L$ is the pressure drop per unit length;
$u$ is the fluid velocity;
$\mu$ is the fluid viscosity;

ε is the void space of the bed (i.e. the ratio of the volume of space unfilled by particles to the total volume of the bed;

$D_p$ is the diameter (i.e. equivalent spherical diameter) of the particles; and ρ is the fluid density.

Therefore, optimisation of the fluid velocity, particle diameter and shape of the particles is essential to minimise the pressure drop per unit length and, consequently, the HTF pumping losses.

A number of empirical relationships have been proposed to describe the heat transfer process between a fluid and particle bed by relating the Nusselt number (Nu), Reynolds number (Re), and Prandtl (Pr) number. For example, Ranz & Marshall proposed the following relationship:

$$Nu = 2 + 1.8(Re)^{0.5}(Pr)^{0.33} \quad (2)$$

The Reynolds number is defined as:

$$Re = \frac{v\rho l}{\mu} \quad (3)$$

and the Nusselt number is defined as:

$$Nu = \frac{hl}{k} \quad (4)$$

where v is the HTF velocity, ρ is the HTF density, μ is the HTF viscosity, h is the heat transfer coefficient between the HTF and the particles, k is the HTF conductivity and l is the relevant characteristic length. As the Prandtl number only relates to the physical properties of the HTF, it can be concluded that the heat transfer coefficient (h) is proportional to the square root of the HTF velocity (v)

Inspection of equations (1), (2), (3) and (4) indicates that pressure losses are proportional to the square of velocity, whereas convective heat transfer is proportional to the square root of velocity.

The present inventors have determined that careful optimisation of the flow rate through the packed bed is essential if the pressure drop is to be controlled within acceptable limits but good heat transfer between the HTF and the thermal mass is to be achieved.

For example, it is desirable to limit the pressure drop across a particular thermal store to 0.5 bar (50 kPa) as a vessel below that pressure is generally not classified as a pressure vessel and is therefore less expensive to manufacture. The inventors have determined that a Nusselt number of greater than 100 is preferable in order to ensure good heat transfer. FIG. 3 shows the predicted performance of such a thermal store across a range of flow rates. It can be seen that there is a narrow 'operating window' of HTF flow rates between about 1 kg/s and 2 kg/s where the store will operate within these specified limits. In a thermal energy storage system, it would be desirable to be able to discharge the store at a rate of about 20% of the charging rate. In that case, a fixed geometry store would suffer either poor thermal performance during discharging or unacceptably high pressure loss during charging.

The aspect ratio of a thermal mass is the ratio of the mean length of the thermal mass to the mean cross-sectional flow area. The inventors have determined that a small aspect ratio, i.e. a large flow area and/or a short length, is desirable for a given thermal mass to minimise the HTF velocity and therefore reduce pressure losses. However, such a small aspect ratio leads to high 'end losses' during the charging and discharging of the store: during charging, the thermal energy from the HTF cannot be completely captured unless an over-long store is used. This is undesirable as the final section of the store near the output of the store is not fully charged and thermal energy flows between the charged and partially charged sections during the storage phase of the cycle, resulting in a degradation of thermal efficiency. A similar problem is encountered during discharge; as the store discharges, the outlet temperature deviates from the storage temperature at the end of the cycle and it is not possible to fully discharge the final section of the store near the outlet without, again, resulting in a loss of thermal efficiency. This is illustrated in FIGS. 4 and 5 which show simulation results for thermal storage devices in which the charging flow is five times greater than the discharge flow. The left-most line in FIGS. 4 and 5 shows a plot of the temperature of the store at its inlet over time. The central line in FIGS. 4 and 5 shows a plot of the temperature of the store in its middle over time. The right-most line in FIGS. 4 and 5 shows a plot of the temperature of the store at its outlet over time. The area shaded in FIG. 4 represents the potential thermal losses due to end effects for the charging flow condition. The discharge process is stopped when the outlet temperature of the store, shown by the right most line in FIG. 5 is too high, leaving part of the store in a partially discharged state. The losses are about double for the lower flow rate case relative to the high flow rate case, as the store has been optimised for a higher flow rate.

Accordingly, there is a need for a thermal energy storage device and method which can be charged and discharged at different rates. There is also a need for a thermal energy storage device and method which can have a longer charge phase than discharge phase, or a longer discharge phase than charge phase.

SUMMARY OF THE INVENTION

The present invention addresses these needs by providing, in a first embodiment:

a thermal energy storage device comprising:
a first thermal mass;
a second thermal mass; and
a third thermal mass;
wherein:
the aspect ratios of at least two of the first, second and third thermal masses are different to one another; and
an arrangement of conduits and valves configured to direct a heat transfer fluid to pass through a combination of one or more of the thermal masses,
wherein the arrangement of conduits and valves is such that the thermal masses can be isolated from one another.

In a preferred embodiment, the arrangement of conduits and valves is configured to allow the HTF to be directed through:

i) all of the first, second and third thermal masses, and alternatively ii) two of the first, second and third thermal masses, and alternatively iii) one of the first, second and third thermal masses The arrangement of conduits and valves may be such that the HTF can be directed through two of the first and second thermal masses in parallel and the third thermal mass in series, and alternatively through two of the first and second thermal masses in parallel.

The HTF may comprise a gas or a liquid. The HTF is used to either heat or cool the thermal mass.

The arrangement of conduits and valves enable the HTF to flow over one or more of the thermal masses to transfer thermal energy to the thermal mass from the HTF, and from the thermal mass to the HTF.

A thermal mass is a substance which is capable of absorbing and giving off thermal energy.

The thermal energy storage device may comprise more than three thermal masses.

Each of the at least three thermal masses may comprise a single thermal cell or a plurality of thermal cells arranged in parallel with one another. When one or more of the thermal masses comprise a plurality of thermal cells, each thermal cell within a thermal mass may have the same or different mean cross-sectional areas. When a thermal mass comprises more than one thermal cell arranged in parallel with one another, the aspect ratio of the thermal mass is the ratio of the mean length of the thermal cells to the sum of the mean cross-sectional flow area of the thermal cells.

The first, second and third thermal masses may comprise solid particles and the diameter of the particles in at least two of the first, second and third thermal masses may be different to one another. Alternatively, the diameter of the particles in at least two of the first, second and third thermal masses may be the same as one another. When referring to the diameter of the particles, the mean equivalent spherical diameter of all particles within the thermal mass is meant.

Each thermal cell may comprise one or a combination of i) a packed bed of solid particles through which the HTF can pass directly to carry thermal energy to and from the thermal energy storage device, ii) a packed bed of solid particles arranged around at least one conduit through which the HTF can pass, iii) a solid mass "matrix" including a plurality of channels through which the HTF can pass, or iv) a volume of phase change material.

When the first, second and third thermal masses comprise solid particles the thermal cell may comprise one, or a combination, of options i) and ii).

A phase change material is a material which is capable of storing and releasing energy by changing its state, for example from solid to liquid or liquid to gas and vice versa.

In option ii), the packed bed is isolated from the HTF by the at least one conduit.

In options i) and ii), the particles may be spherical or near spherical particles. The mean equivalent spherical diameter of the particles is preferably 1 to 25 mm. Each thermal cell may include a plurality of solid particles having the same equivalent spherical diameters, or different equivalent spherical diameters. In addition or alternatively, each of the solid particles may be formed from different materials. The equivalent spherical diameters of the particles within each thermal cell may increase or decrease along the length of the thermal cell, from the inlet to the outlet. The material from which the particles within each thermal cell are formed may change along the length of the thermal cell.

The mean equivalent spherical diameter of the particles in one thermal cell may be different to, or the same as, those in another thermal cell. By varying the diameter of the particles between the thermal masses, the pressure drop/heat transfer characteristics of the thermal store can be optimised.

Each thermal cell may have a circular, hexagonal, square, rhomboidal or any other shape cross-section that could easily be packaged into a support structure.

Each thermal mass may have a high thermal capacity to minimise the volume of the thermal mass. Each thermal mass preferably also has a low cost.

Preferably, each thermal mass has a low thermal conductivity. Preferably, each thermal mass has a thermal conductivity less than 20 W/mK. More preferably, each thermal mass has a thermal conductivity less than 5 W/mK. A low thermal conductivity is desirable in order to minimise heat transfer through the thermal mass during charging, discharging or storage of a 'part full' store. The inventors have found that highly conductive media, such as copper, conducts significant heat through the axis of the store, thus degrading the thermal efficiency of the store. This is illustrated in the simulation results shown in FIG. 6 for the inlet and outlet temperature of stores containing copper and rock particles plotted against time. In particular FIG. 6 shows that the temperature drop at the inlet of the thermal store is slower for copper than for rock, and that the temperature drop at the outlet of the thermal store is faster for copper than for rock due to conduction down the length of the store. FIG. 6 also shows the energy that is lost from a copper filled store compared to a rock filled store.

Therefore, to create an efficient thermal store, it is desirable for each thermal mass to have a high thermal capacity to conductivity ratio. Preferably each thermal mass has $Cp*\rho/k>180$ s/mm, more preferably each thermal mass has $Cp*\rho/k>500$ s/mm, where Cp is the specific heat capacity, $\rho$ is the density, and k is the thermal conductivity of the particles comprising the thermal mass. Table 1 below summarises the properties of a number of potential materials.

TABLE 1

| Material | Density kg/m$^2$ | Specific Heat Capacity kJ/kgK | Thermal Conductivity W/mK | Relative Cost | Thermal Mass to conductivity ratio s/mm |
|---|---|---|---|---|---|
| Stainless Steel | 7865 | 0.46 | 19 | High | 190 |
| Copper alloy | 8940 | 0.383 | 386 | Very High | 8.87 |
| Rock (granite) | 2630 | 0.92 | 2.79 | Low | 867 |
| Water (ice) | 996 | 2.05 | 2.22 | Low | 919 |

From table 1 it can be seen that rock is a preferred material for the particles for each thermal mass as it is cost effective and has favourable thermal properties. Preferably, the rock comprises granite, basalt or a manmade ceramic material. Alternatively, water in the form of ice could be used for the particles for each thermal mass. Preferably, the ice would not change its state across the operating range of the store.

The thermal energy storage device may further comprise a support structure to support the thermal masses. The support structure may further support at least a portion of the arrangement of conduits and valves.

The thermal energy storage device may further comprise insulation to insulate each thermal mass to minimise thermal losses from the thermal mass during storage.

The insulation may comprise thermally insulating material applied to the inside of the support structure and/or thermal breaks between a base of the thermal mass and the support structure. Thermal breaks are layers of low conducting material or air spaces that prevent the conduction of heat through the thermal break. Each thermal cell may be insulated on its inside. In a particular embodiment, the internal insulation comprises a double skin design in which the external support structure is isolated from the thermal mass or cells by a layer of insulation and a thin inner skin in contact with the thermal mass or cells. Alternatively, a spray coating of thermally insulating material may be applied to the inside of the support structure, or encapsulated insulation material may be fitted to the inside of the support structure.

The thermal energy storage device may further comprise insulation to insulate the arrangement of conduits and valves to minimise thermal losses from the storage device.

Isolating the thermal masses from one another helps to prevent convective losses from the thermal energy store during the storage phase between charging and discharging. In particular, a valve may be provided at the inlet and outlet of each thermal mass.

In use, the HTF is used to heat or cool the first, second and third thermal masses. The thermal energy is then stored in the thermal masses until required, when the HTF is then passed over the mass to recover the heat or cold thermal energy for transfer to another process.

The thermal energy storage device of the present invention is capable of storing heat or cold thermal energy. The system is particularly suitable for storing high grade (i.e. ultra low temperature) cold for use in the liquefaction phase of a cryogenic energy storage system. Ultra low temperatures are those of −100° C. or less. Cryogenic temperatures are those of −150° C. or less.

The thermal energy storage device may be optimised to operate as a store for high grade cold within a cryogenic energy storage system, enabling the time shifting of electricity production from periods of low demand or oversupply, to meet periods of high demand or low supply.

The thermal energy storage device of the present invention allows for different thermal energy and HTF flow rates for the charging and discharging phases, i.e. it allows for asymmetric charge and discharge phases. In a preferred embodiment, the system allows for a four phase thermal storage process involving a charge phase, a storage phase, an initial discharge phase, and a final discharge phase. Alternatively, or in addition, the charge phase may include multiple charging phases. In a preferred embodiment, the system allows for a four phase thermal storage process involving an initial charge phase, a final charge phase, a storage phase, and a discharge phase. Consequently, the system can be used with multiple and/or interrupted charge and discharge phases so that the system can function without being fully charged or fully discharged.

The arrangement of conduits and valves may be such that the HTF can be directed through two or more of the thermal masses in series.

The arrangement of conduits and valves may further be such that a first and second of the thermal masses are in parallel and a third of the thermal masses is in series with the first and second thermal masses.

The arrangement of conduits and valves may further be such that the HTF can be directed through two or more of the thermal masses in parallel.

In a second embodiment, the present invention provides a method of storing energy comprising:
  providing a thermal energy storage device comprising:
  a first thermal mass,
  a second thermal mass, and
  a third thermal mass,
  wherein:
    the aspect ratios of at least two of the first, second and third thermal masses are different to one another; and
    providing an arrangement of conduits and valves configured to direct a heat transfer fluid to pass through a combination of one or more of the thermal masses, wherein the arrangement of conduits and valves is such that the thermal masses can be isolated from one another;

charging the thermal energy storage device with thermal energy by directing a heat transfer fluid through the first, second and third thermal masses; then
  storing the thermal energy in the thermal energy storage device for a period of time; then
  discharging at least a portion of the thermal energy from the thermal energy storage device by directing a heat transfer fluid through the first, second and third thermal masses, wherein
  the step of charging and/or the step of discharging comprises a multi-stage process.

A multi-stage discharging process may comprise:
  discharging a portion of the thermal energy from the thermal energy storage device by directing a heat transfer fluid through a first configuration of one or more of the thermal masses; and then
  discharging a further portion of the thermal energy from the thermal energy storage device by directing a heat transfer fluid through a second configuration of one or more of the thermal masses, wherein the first configuration is not the same as the second configuration.

The first configuration may comprise the first and second thermal masses in series.

The second configuration may comprise the second and third thermal masses in series. Alternatively, the second configuration may comprise the first, second and third thermal masses in series.

A multi-stage charging process may comprise:
  charging a portion of the thermal energy into the thermal energy storage device by directing the heat transfer fluid through a third configuration of one or more of the thermal masses; and then
  charging a further portion of the thermal energy into the thermal energy storage device by directing the heat transfer fluid through a fourth configuration of one or more of the thermal masses, wherein the third configuration is not the same as the fourth configuration.

The step of charging the thermal energy storage device may comprise directing the HTF through the first, second and third thermal masses, wherein the second and third thermal masses are arranged in parallel, and the first thermal mass is arranged in series with the second and third thermal masses.

Alternatively, the step of charging the thermal energy storage device may comprise directing the HTF through the first, second and third thermal masses arranged in series.

The statements relating to the first embodiment are also applicable to the second embodiment.

In all embodiments, the aspect ratio of each thermal mass is the ratio of the mean length of the thermal mass to the mean cross-sectional flow area of the thermal mass. Thermal masses with different aspect ratios may be provided by providing thermal masses of different mean cross-sectional area. Each of the thermal masses may have uniform cross-sectional areas along their length. Alternatively, each of the thermal masses may have varying cross-sectional areas along their length. For example, each of the thermal masses may have tapering cross-sections. When a thermal mass comprises more than one thermal cell, one or more of the thermal cells may have tapering cross-sections.

The aspect ratios of at least two of the first, second and third thermal masses may be different to one another. Preferably, the aspect ratios of all three of the thermal masses are different to one another.

Preferably, the mean cross-sectional area of the third thermal mass is smaller than the mean cross-sectional area of the second thermal mass. Preferably the mean cross-sectional area of the second thermal mass is smaller than the mean cross-sectional area of the first thermal mass.

Preferably the last thermal mass through which the HTF flows during final discharge has the smallest mean cross-sectional area of the three thermal masses. In this case, such a smaller flow area in the final part of the store during discharge allows the optimum thermal efficiency to be achieved.

The thermal energy storage device may comprise more than three thermal masses.

Each of the at least three thermal masses may comprise a single thermal cell or a plurality of thermal cells arranged in parallel with one another. Preferably, the first thermal mass comprises more thermal cells than the second thermal mass which, in turn, comprises more thermal cells than the third thermal mass. In an exemplary embodiment the first thermal mass comprises five thermal cells in parallel, the second thermal mass comprises four thermal cells in parallel, and the third thermal mass comprises a single thermal cell.

The devices and methods of the present invention are capable of operating at different charging and discharging rates, i.e. the HTF can have a different flow rate through the thermal masses when charging the device to that when discharging the device. The charging phase may be of a longer duration than the discharging phase. Alternatively, the charging phase may be of a shorter duration than the discharging phase. The HTF flow rate can also be varied during the charging and discharging phases to maximise the thermal efficiency of the store, in particular at the end of the charging or discharging process where end effects can be significant. For example, significant deviation of the outlet temperature from the temperature observed during most of either the charge or discharge phases of the cycle can be reduced by increasing the flow rate towards the end of the charging or discharging phase of the cycle.

Consequently, the thermal energy storage device and method of the present invention have the capability to vary the available thermal mass cross-sectional area or particle size between charging and discharging to match the thermal and flow performance of the store. The device and method also have the capability to reduce the cross-sectional flow area or particle size near the output end of the store to minimise end-losses caused by the low flow rate part of the cycle.

The provision of at least three separate thermal masses with different aspect ratios and/or mean particle sizes means that the HTF flow area during charging and discharging can be varied to match the thermal and flow performance of the store. In addition, a reduced flow area at the output end of the store can be chosen to minimise end effects caused during a reduced flow-rate part of the discharge cycle.

BRIEF DESCRIPTION OF THE DRAWINGS

Embodiments of the present invention will now be described in detail with reference to the figures in which.

DETAILED DESCRIPTION OF THE INVENTION

In a preferred embodiment, the present invention addresses the needs identified above by providing a thermal energy storage device and method in which the aspect ratio (flow area to length) for the charging and discharging phases of the store can be varied.

For example, in the case of a thermal store in a cryogenic energy storage system, a 4 hour charging period is typically required for a 20 hour discharge period. Therefore, the flow rates during the charging period will typically be five times larger than those during the discharge period and it is desired to provide a system with optimum properties during both charge and discharge.

In the case of a cryogenic energy storage system, the thermal masses are cooled down during the charging process and then cold gas is extracted from the store during the discharge process. The following detailed description is specific to a cryogenic energy storage system. However, the disclosed thermal storage device and method could equally be applied to systems storing heat above ambient temperatures where the thermal masses are heated during the charging process and then the heat energy is extracted from the store during the discharge process providing hot gas, or to systems requiring a shorter charging time in relation to the discharge time.

Figure 7A:
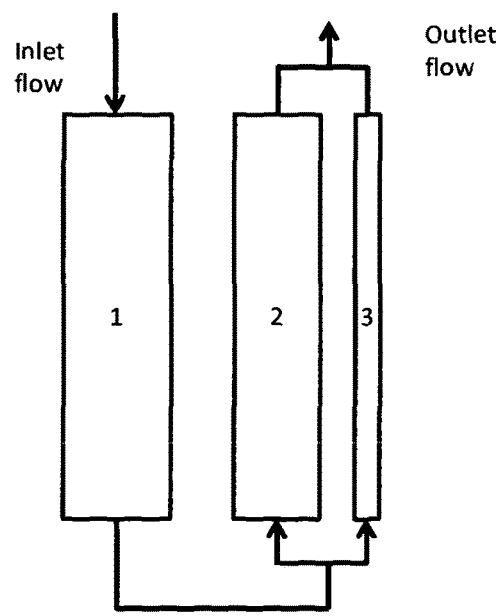
FIG. 7*a*) shows a thermal energy storage device according to an embodiment of the present invention during a charging phase.

FIGS. 7*a*), *b*) and *c*) show a thermal energy storage device according to an embodiment of the present invention which includes three cells of thermal storage material. The three cells have different cross-sectional areas. The first thermal mass comprises cell 1, the second thermal mass comprises cell 2, and the third thermal mass comprises cell 3. Cell 1 has a larger mean cross-sectional area than cell 2 which, in turn, has a larger mean cross-sectional area than cell 3. Consequently, the device shown in FIGS. 7*a*), *b*) and *c*) has a variable flow area.

The device operates in the following manner:

Charging:

During charging as shown in FIG. 7*a*) the HTF flow passes through the first cell 1 and then through cells 2 and 3. Cells 2 and 3 are arranged in parallel. Cell 1 is arranged in series with cells 2 and 3. The cross-sectional area of cell 1 is chosen such that the optimal heat transfer/pressure drop relationship is achieved during charging.

Storage:

The cells are isolated from one another to prevent convective losses from the thermal energy store until the store is to be discharged.

Figure 7B:
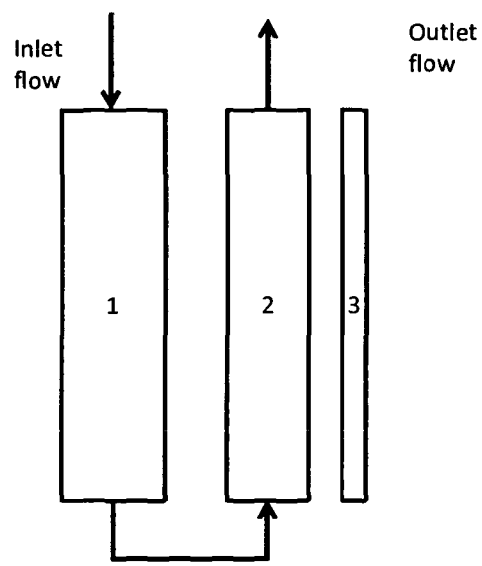
FIG. 7*b*) shows the thermal energy storage device of FIG. 7*a*) during an initial discharging phase.

Initial Discharge:

During initial discharge, as shown in FIG. 7*b*), the HTF flow initially passes through cell 1 and then cell 2, with cell 3 being bypassed from the HTF flow circuit.

Figure 7C:
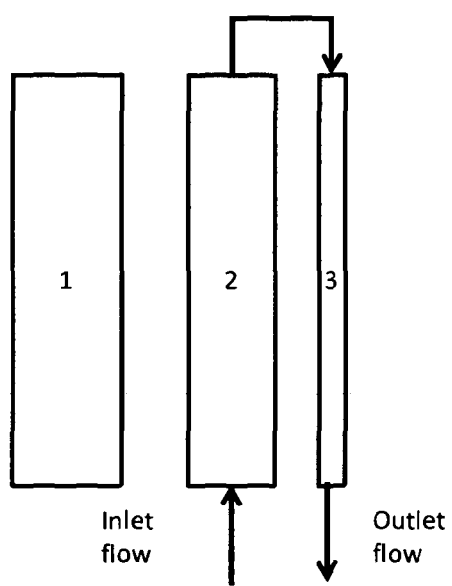
FIG. 7*c*) shows the thermal energy storage device of FIG. 7*a*) during a final discharging phase.

Final Discharge:

After undergoing initial discharge for a period of time, cell 2 will be almost fully discharged and the outlet temperature of the HTF will start to rise. During final discharge as shown in FIG. 7*c*), cell 1 is isolated from the circuit and the outlet flow from cell 2 is directed through cell 3. The cross-sectional flow area of cell 3 is reduced relative to that of cells 1 and 2 in order to minimise end-losses for the reduced discharge flow rate. Cell 2 is thus fully discharged and only a small mass of the material in cell 3 is not fully discharged. Thus, the amount of thermal energy that is not discharged from the thermal storage device is minimised. In some cases, it is not necessary to bypass cell 1, thus simplifying the flow circuit if the pressure loss across cell 1 is low.

Figure 8A:
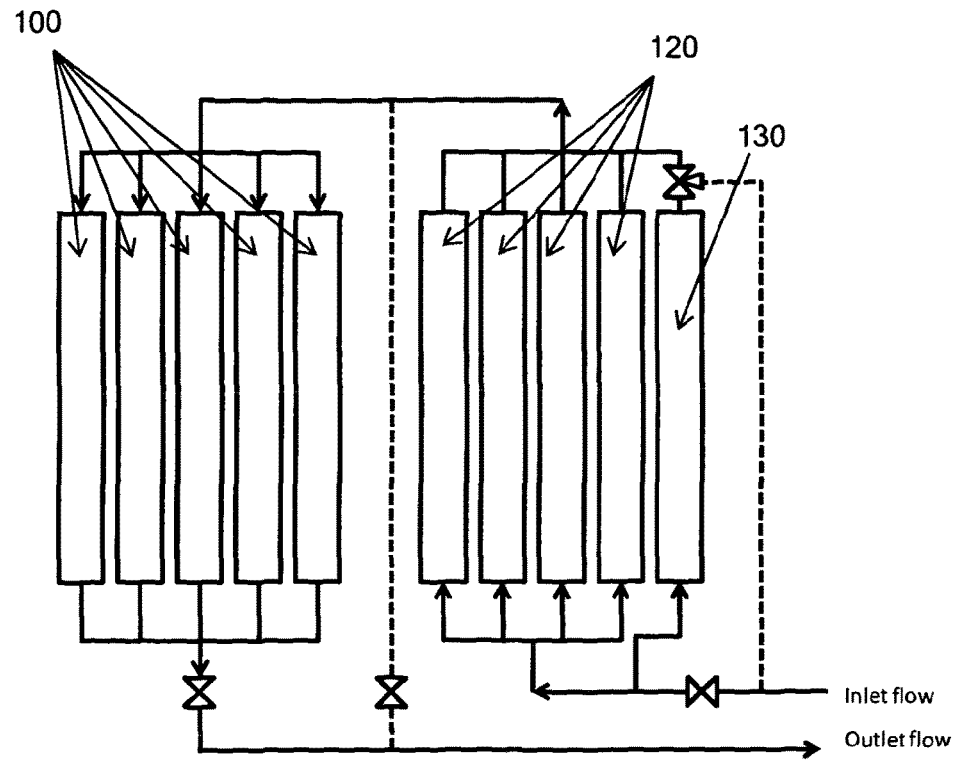
FIG. 8*a*) shows a thermal energy storage device according to another embodiment of the present invention during a charging phase.

FIGS. 8*a*), *b*) and *c*) show a thermal store according to another embodiment of the invention. The embodiment of FIG. 8 is very similar to that of FIG. 7 except that the first thermal mass 100 comprises a first bank of five thermal cells arranged in parallel, the second thermal mass 120 comprises a second bank of four thermal cells arranged in parallel, and the third thermal mass 130 comprises a single thermal cell. Consequently, in this embodiment the variable cross-sectional area is achieved by varying the number of columns of the same cross-sectional area in each thermal mass. The aspect ratio of each thermal mass is the ratio of the mean length of the thermal cells within the thermal mass to the sum of the mean cross-sectional flow areas of each thermal cell within the thermal mass.

Figure 8B:
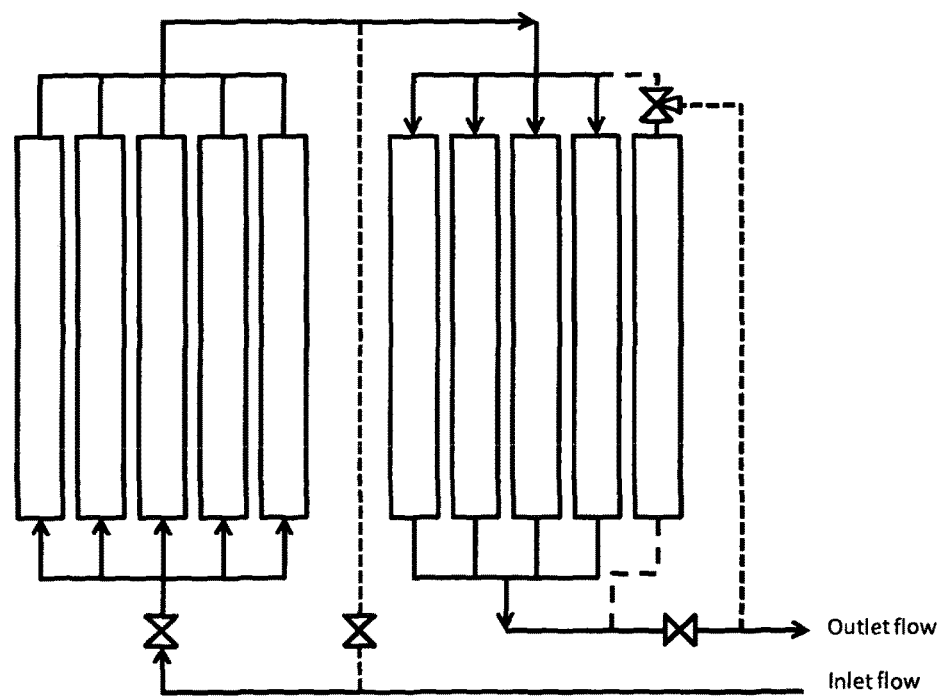
FIG. 8*b*) shows the thermal energy storage device of FIG. 8*a*) during an initial discharging phase.

The basic flow paths are the same as those described above in connection with FIG. 7:

Charging:

As shown in FIG. 8*a*) the first thermal mass 100 is arranged in series with the second 120 and third 130 thermal masses which are, themselves, arranged in parallel, Initial Discharge:

As shown in FIG. 8*b*), during the first phase of discharge, the third thermal mass 130 is bypassed.

Figure 8C:
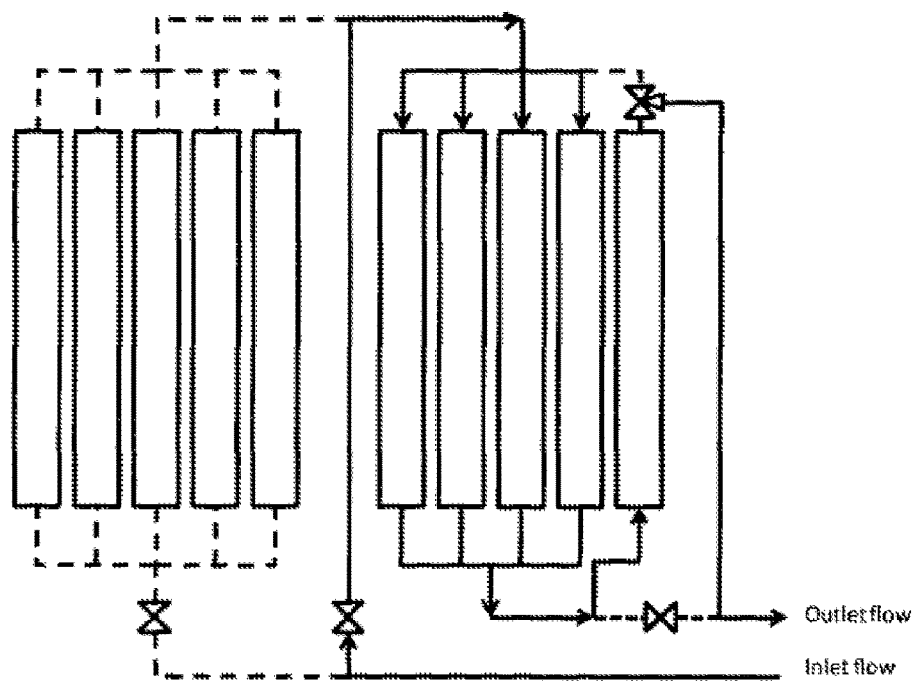
FIG. 8*c*) shows the thermal energy storage device of FIG. 8*a*) during a final discharging phase.

Final Discharge:

As shown in FIG. 8*c*), during the final phase of discharge, the first thermal mass 100 is bypassed and the second 120 and third 130 thermal masses are arranged in series.

This embodiment has the advantage that it can be simpler to manufacture a plurality of identical cells and arrange those cells to create different size thermal masses. In addition, the multiple cell design allows more flexibility in optimising the flow area/pressure drop characteristics of the store for a wider range of flow rates, because it is simple to change the number of cells in each thermal mass by opening and closing valves associated with each cell. This can be useful in the case of power storage devices where the charging and discharging time and flow rates can vary allowing the plant to operate at different loads. Sections of the store can also be taken out of service for maintenance and repair without shutting down the complete system. In addition, a multi-stage charging phase can be used, and both the charging and discharging phases can be interrupted so that the system can be used without being fully charged or discharged.

Figure 9A:
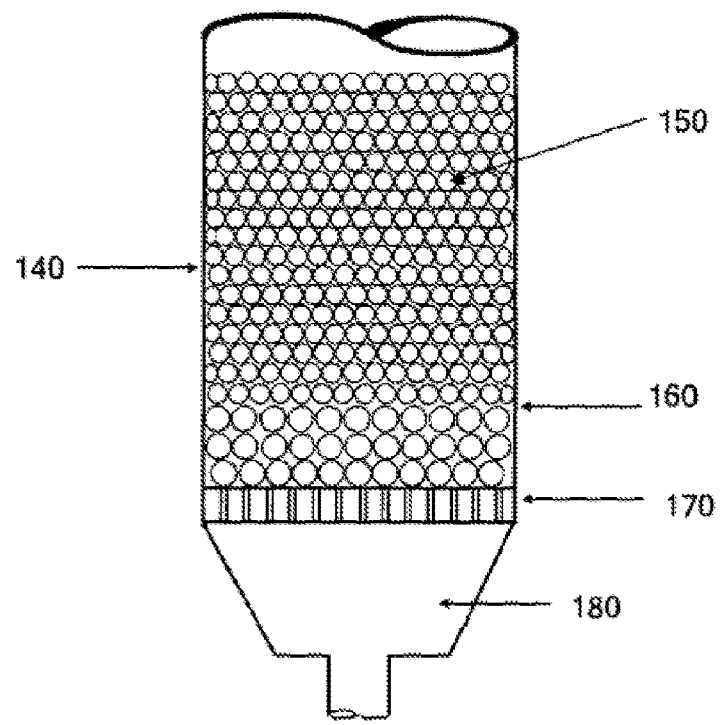
FIGS. 9*a*) and *b*) show a thermal mass for use in embodiments of the present invention in which the thermal mass has a double skin design, thermal breaks and internal insulation.

The thermal energy storage device further comprises a support structure to support the thermal masses. FIG. 9*a* shows an example of a thermal mass. Each thermal mass comprises a container 140 which contains a packed bed of particles 150. The container includes an optional layer 160 of larger particles which assist flow distribution, and a grid 170 to support the particles and distribute the flow through the particles. The container includes a plenum 180 to distribute the HTF flow evenly over the bed of particles.

The cells could be circular, hexagonal, square, rhomboidal, or any other shape that could easily be packaged into the support structure.

In any of the disclosed embodiments of the invention, each thermal cell may consist of a packed bed of spherical or near spherical particles 150 typically 1 to 25 mm in diameter (see FIGS. 9*a* and 9*b*). The particles may comprise rock. The flow through the bed is insufficient to 'fluidise' the bed and the particles remain static during the charging and discharging process. This design provides a very large surface area for heat transfer between the fluid and thermal mass and offers a very cheap design.

The diameter of the particles can be varied between the thermal masses to optimise the pressure drop/heat transfer characteristics of the thermal store. For example, in the embodiment shown in FIG. 7, cell 3 could be filled with particles having a smaller mean equivalent spherical diameter that have a higher surface area than the particles in cells 1 and 2. Consequently cell 3 will deliver more thermal energy more efficiently during the final discharge phase of the cycle.

In order to achieve high thermal efficiency, it is preferable to minimise thermal losses from the thermal energy storage device. Thermal losses can be (a) to the environment and (b) axially along the length of the store during charge/discharge from one part of the storage media to another at a different temperature, or if the store support structure is of a higher conductivity than the storage media.

There are two main sources of thermal loss that can be controlled:

i) Radial conduction out of the storage material, through the walls of the store to the support structure and to the environment, or along the axis of the store;

ii) Conduction to the base of the support structure and its surroundings.

Therefore, thermal isolation of the thermal mass from the support structure is desirable. This isolation can be achieved by applying thermally insulating material 190 to the inside of the support structure 200 and/or thermal breaks 210 between the base of the store and the support structure, as shown in FIG. 9*b*. In a particular embodiment shown in FIG. 9*b*, the internal insulation 190 of the store is achieved by a 'double skin' design in which the external load carrying part of the store 200 is isolated from the thermal mass by a layer of insulation and a thin inner 'skin' in contact with the thermal mass. Alternative solutions include the application of a spray coating to the inside of the store or the fitting of encapsulated insulation material to the inside of the store. An additional benefit of this design is that the support structure will be at or near ambient temperature allowing low cost structural materials such as mild steel to be used.

Design of a Multi Cell Thermal Store

A preferred embodiment of a thermal energy storage device according to the present invention is shown in FIG.

Figure 10:
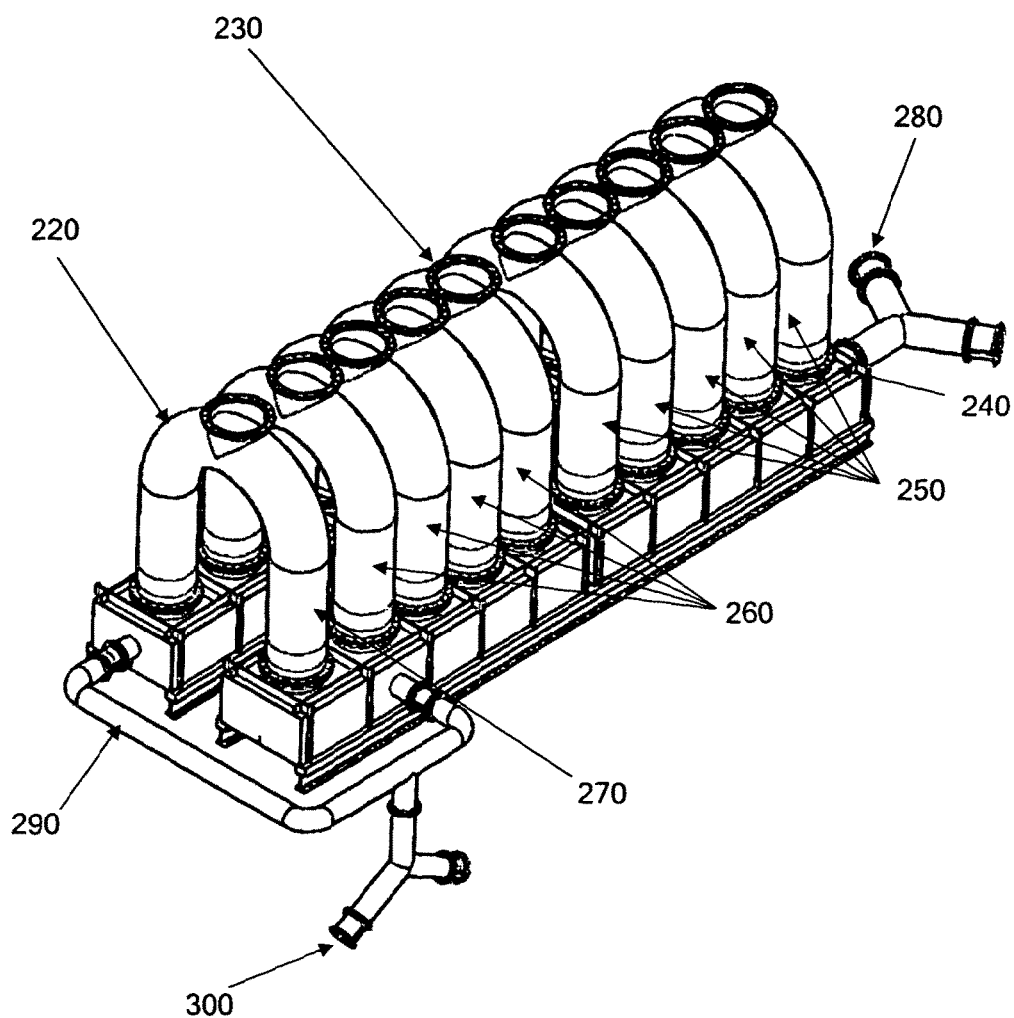
FIG. 10 shows a preferred embodiment of a thermal energy store according to the present invention.

10. The thermal store is made up of a series of tubes 220 (thermal cells) formed in a "U" configuration. Alternatively, the tubes could be straight, or formed in a serpentine shape with multiple bends. The tubes 220 are filled with the thermal storage media. Preferably the tubes 220 are fully filled without leaving a gap through which the HTF can flow without transferring heat between the thermal storage media and the HTF. This generally means that a completely horizontal orientation is preferably avoided. In the embodiment shown in FIG. 10 a filling point 230 is provided at the top of each bend.

The tubes 220 are grouped together in a common manifold 240 and, by means of a set of valves, different tubes 220 can be connected to the manifold 240 at a time. During charging, a first set 250 of five tubes 220 (the first thermal mass) are connected in series with a second set 260 of four tubes 220 (the second thermal mass) and a third tube 270 (the third thermal mass). The second set 260 and the third tube 270 are arranged in parallel. An HTF is pumped through the device via an inlet pipe 280. During the first phase of discharge, the first set 250 of five tubes 220 is arranged in series with the second set 260 of four tubes 220. The third tube 270 is isolated from the flow circuit. In the final stage of discharge, the third tube 270 is introduced in series with the first and seconds sets 250, 260 of tubes 220. A bypass 290 is included to connect the third tube 270 into the circuit whilst retaining the outlet pipe 300 in the same location.

The design can be further improved by adding dampers or valves to each tube to enable the HTF flow to be varied between each tube, and individual tubes to be isolated during the charging and discharging cycles. This enables the local velocity of the HTF to be varied between each tube so as to optimise the heat transfer rate from the tubes so as to maximise the thermal efficiency of the thermal store. This is useful as it allows a wider range of charging and discharging flows to be accommodated. For example, if the charging flow is low, or the charging period is shorter than expected, part of the store can be isolated so that only a few tubes 220 are charged, improving storage efficiency.

Figure 1:
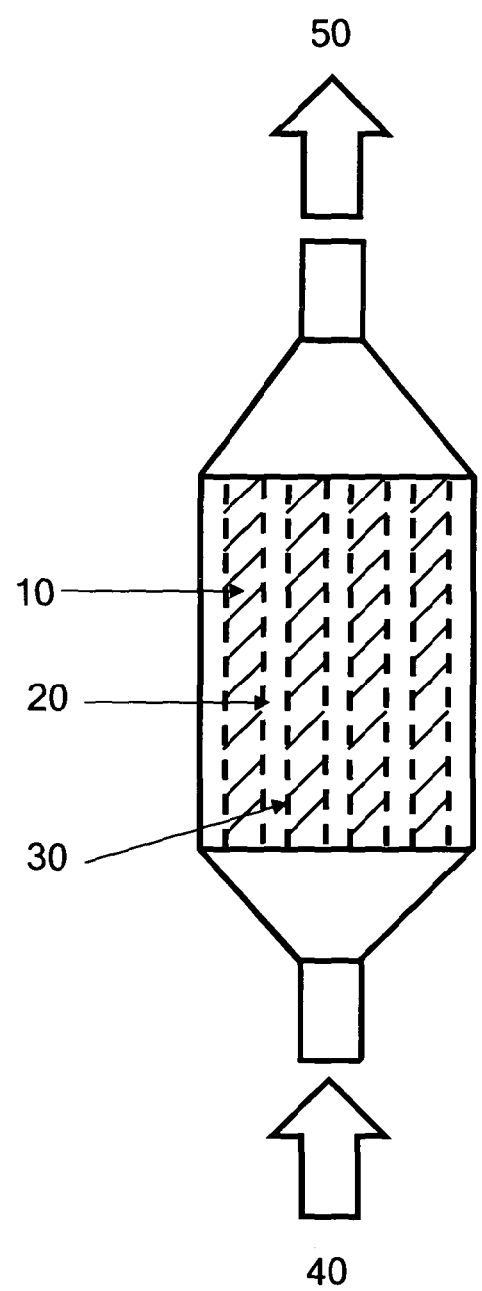
FIG. 1 shows a representation of a generic thermal energy store.
Figure 2:
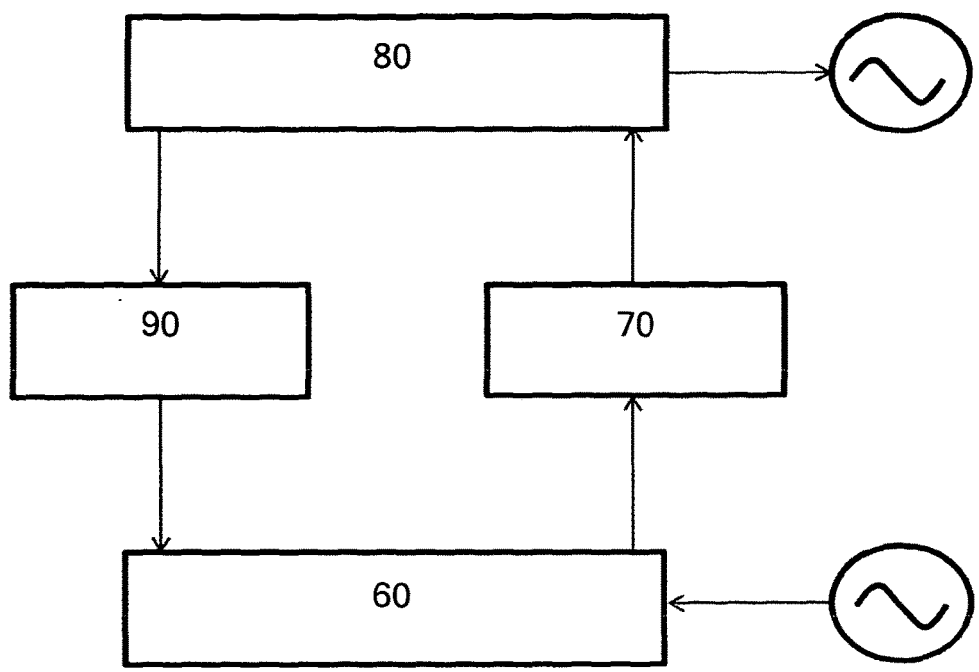
FIG. 2 shows a representation of a thermal store integrated with a cryogenic energy storage system.
Figure 3:
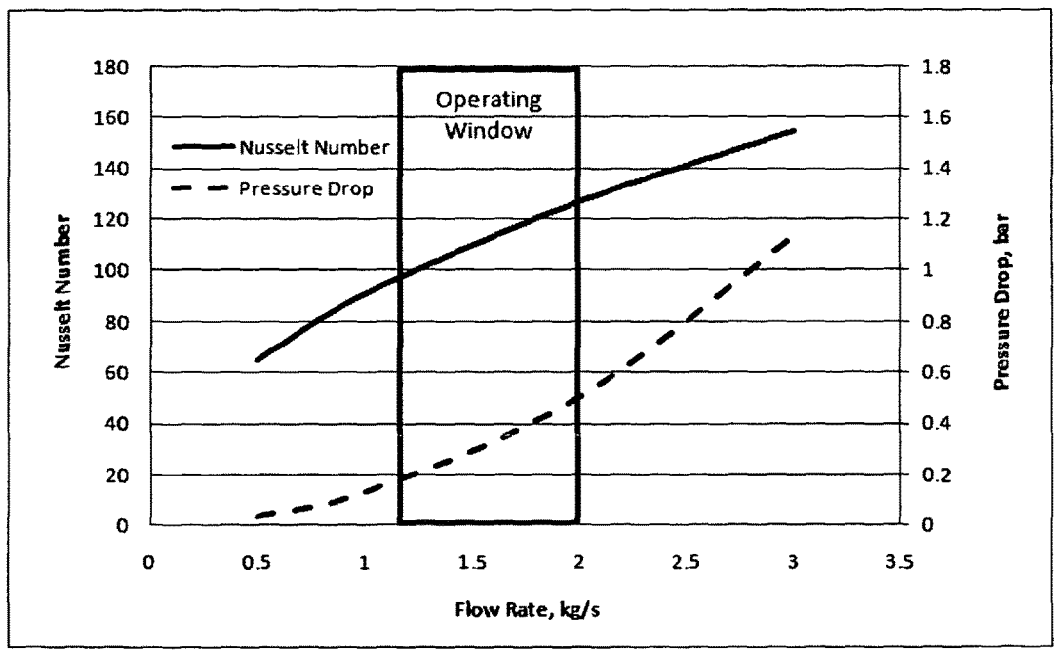
FIG. 3 shows the graphical relationship between heat transfer and fluid flow rate, and pressure drop and fluid flow rate.
Figure 4:
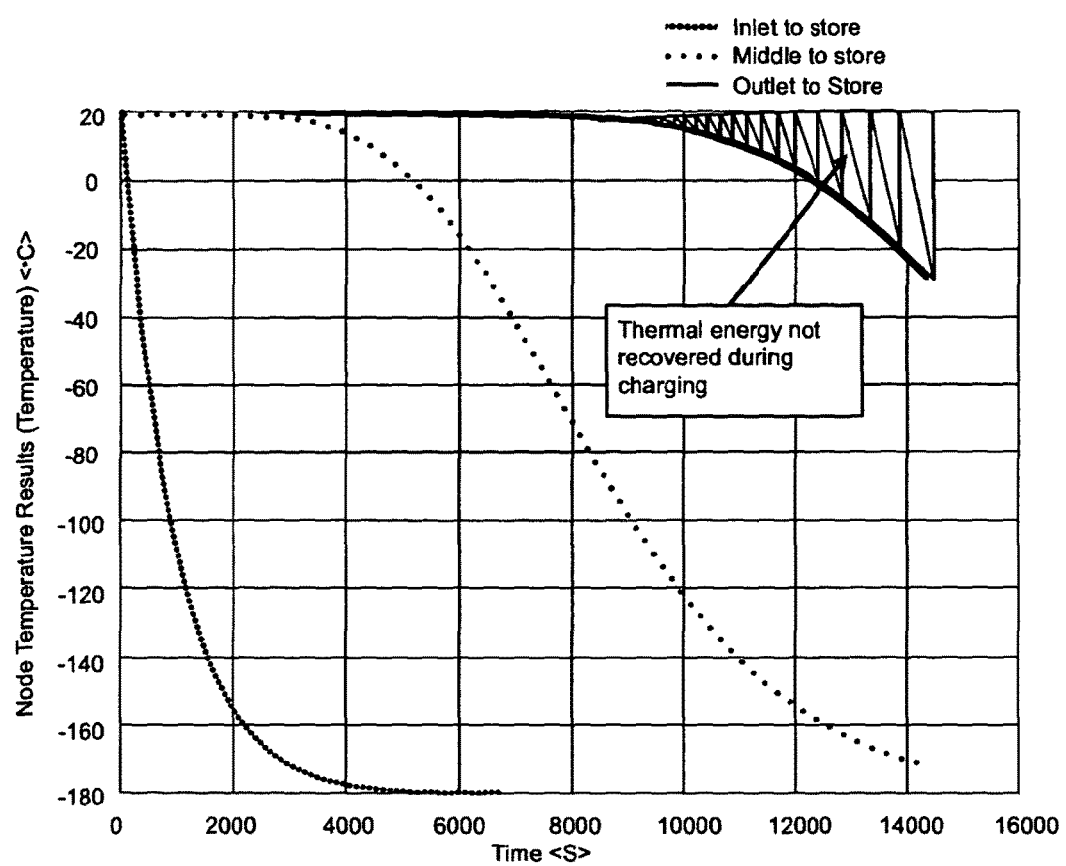
FIG. 4 shows a graph representing the temperature of the thermal store versus time during charging of a modelled thermal energy store.
Figure 5:
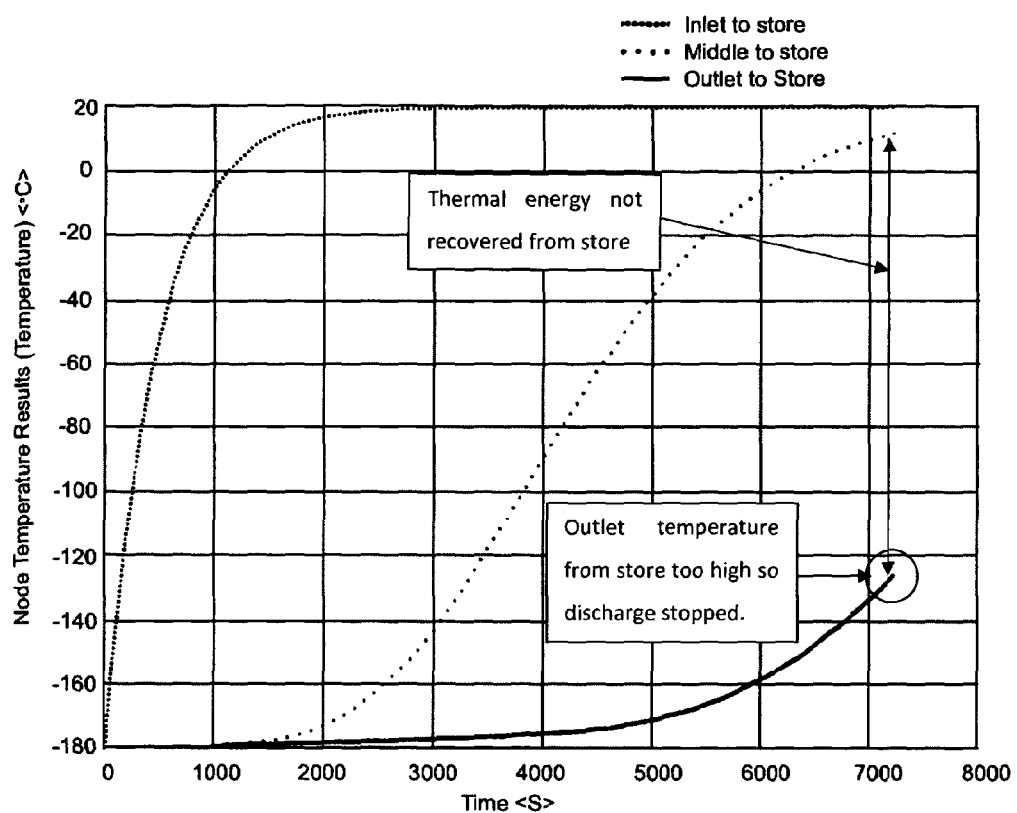
FIG. 5 shows a graph representing the temperature of the thermal store versus time during discharging of the same thermal energy store modelled in FIG. 5.
Figure 6:
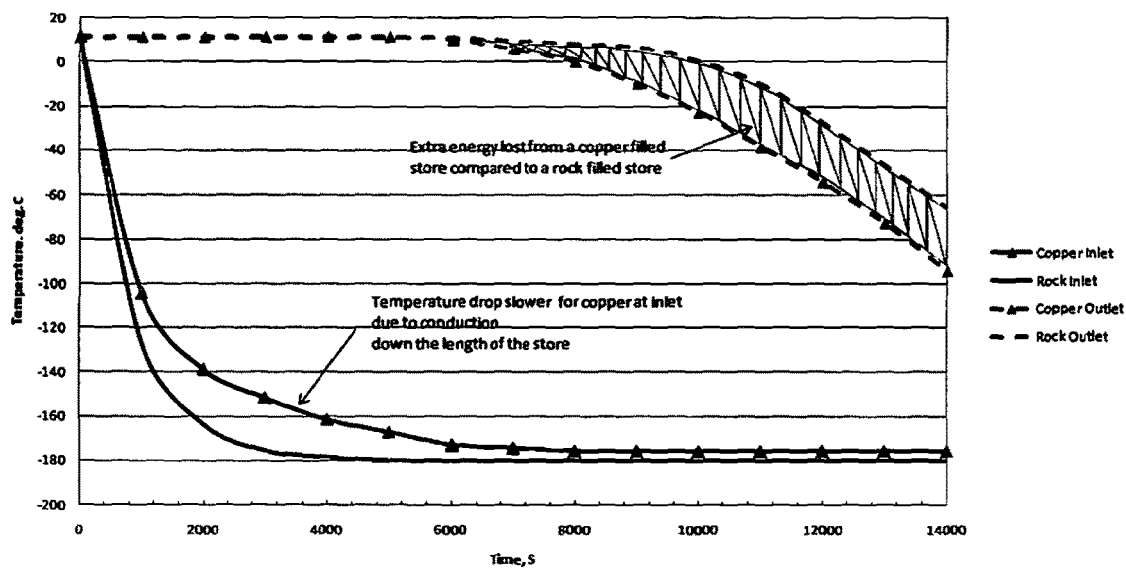
FIG. 6 shows a simulation of the effect of different storage materials on the thermal efficiency of the store.

In addition, it is often beneficial to vary the bulk HTF flow rate during either the charge and or discharge phase, in particular towards the end of the charge or discharge phase. Referring to FIG. 5, the temperature at the exit of the store is often observed to rise towards the end of the discharging phase of the cycle. Increasing the HTF flow rate towards the end of the discharge cycle enables more effective heat transfer from the store and more even temperature at the exit of the store over the discharge cycle. This will increase the rate at which the store is discharged and may result in an undesired shorter discharge time. This can be countered by reducing the flow rate of the HTF during the early stage of the discharge phase to reduce the heat transfer rate. Careful optimisation of the flow rate during the discharge phase of the cycle can deliver a more even discharge temperature over the cycle.

It will of course be understood that the present invention has been described by way of example, and that modifications of detail can be made within the scope of the invention as defined by the following claims.

The invention claimed is:

1. A thermal energy storage device comprising:
a first thermal mass having a first aspect ratio;
a second thermal mass having a second aspect ratio;
a third thermal mass having a third aspect ratio;
wherein the aspect ratios of at least two of the first, second and third thermal masses are different from one another;
a plurality of conduits and valves having open and closed valve settings to control flows of a heat transfer fluid through multiple combinations of the thermal masses;
wherein the arrangement of conduits and valves is such that the thermal masses can be isolated from one another;
wherein the first, second and third thermal masses comprise a material that is capable of:
i) absorbing thermal energy from the heat transfer fluid;
ii) storing the thermal energy absorbed from the heat transfer fluid; and
iii) transferring stored thermal energy to the heat transfer fluid;
a first arrangement of the conduits and valves for charging the thermal masses in which the valves are set to direct the heat transfer fluid through at least two of the thermal masses in parallel;
a second arrangement of the conduits and valves for discharging the thermal masses in which the valves are set to direct the heat transfer fluid through at least two of the thermal masses in series; and
the first arrangement of conduits and valves being related to the second arrangement of conduits and valves to accommodate higher flow rates during the charging of the thermal masses than during the discharging of the thermal masses while reducing differences between pressure drops of the heat transfer fluid across the thermal masses associated with the different flow rates.

2. The thermal energy storage device of claim 1, wherein the first thermal mass has a cross-sectional area larger than respective cross-sectional areas of the second and third thermal masses, and the first arrangement of conduits and valves includes the valves being set to direct the heat transfer fluid through:
i) the second and third thermal masses in parallel, and
ii) the first thermal mass in series with the second and third thermal masses.

3. The thermal energy storage device of claim 1 further comprising a support structure to support the thermal masses.

4. The thermal energy storage device of claim 1 further comprising thermally insulating material to insulate each thermal mass.

5. The thermal energy storage device of claim 1 wherein a thermally insulating material is applied to the inside of a support structure and/or thermal breaks are provided between a base of each thermal mass and the support structure.

6. The thermal energy storage device of claim 1 wherein a thermally insulating material comprises a double skin design in which a support structure is isolated from each thermal mass by a layer of insulation and a thin inner skin in contact with each thermal mass.

7. The thermal energy storage device of claim 4 wherein the thermally insulating material comprises a spray coating applied to the inside of the support structure, or encapsulated insulation material fitted to the inside of the support structure.

8. The thermal energy storage device of claim 1 wherein the first thermal mass has a cross-sectional area larger than respective cross-sectional areas of the second and third thermal masses, and the second arrangement of conduits and valves includes the valves being set to direct the heat transfer fluid through the first and second thermal masses in series and to bypass the third thermal mass.

9. The thermal energy storage device of claim 8 wherein the second arrangement of the conduits and valves discharges the first and second thermal masses during a first phase of the discharge, and a third arrangement of the conduits and valves discharges the second and third thermal masses in a second phase of the discharge in which the valves are set to direct the heat transfer fluid through the second and third thermal masses in series and to bypass the first thermal mass.

10. A method of storing energy comprising:
providing a thermal energy storage device comprising:
a first thermal mass having a first aspect ratio,
a second thermal mass having a second aspect ratio, and
a third thermal mass having a third aspect ratio,
wherein the aspect ratios of at least two of the first, second and third thermal masses are different from one another;
providing a plurality of conduits and valves having open and closed valve settings to direct a heat transfer fluid through multiple combinations of the thermal masses;
wherein the arrangement of conduits and valves is such that the thermal masses can be isolated from one another;
wherein the first, second and third thermal masses comprise a material that is capable of:
i) absorbing thermal energy from the heat transfer fluid;
ii) storing the thermal energy absorbed from the heat transfer fluid; and
iii) transferring stored thermal energy to the heat transfer fluid;
charging the thermal masses with a first arrangement of the conduits and valves in which the valves are set to direct the heat transfer fluid through at least two of the thermal masses in parallel;
discharging the thermal masses with a second arrangement of the conduits and valves in which the valves are set to direct the heat transfer fluid through at least two of the thermal masses in series; and
relating the first arrangement of conduits and valves to the second arrangement of conduits and valves to accommodate higher flow rates during the charging of the thermal masses than during the discharging of the thermal masses while reducing differences between pressure drops of the heat transfer fluid across the thermal masses associated with the different flow rates.

11. The method of claim 10, wherein the first thermal mass has a cross-sectional area larger than respective cross-sectional areas of the second and third thermal masses, and wherein the step of discharging comprises:
discharging a portion of the thermal energy from the thermal energy storage device by setting the valves in the second arrangement of conduits and valves to direct the heat transfer fluid through the first and second thermal masses in series and to bypass the third thermal mass; and then
discharging a further portion of the thermal energy from the thermal energy storage device by setting the valves in a third arrangement of conduits and valves to direct the heat transfer fluid through the second and third thermal masses in series and to bypass the first thermal mass.

12. The method of claim 10, wherein the first thermal mass has a cross-sectional area larger than respective cross-sectional areas of the second and third thermal masses, and wherein the step of charging comprises:
charging at least a portion of the thermal energy into the thermal energy storage device by directing the heat transfer fluid through the second and third thermal masses in parallel and directing the heat transfer fluid through the first thermal mass in series with the second and third thermal masses.

13. The method of claim 10 wherein the heat transfer fluid comprises a gas or a liquid.

14. The method of claim 10 wherein each of the thermal masses comprises a single thermal cell or a plurality of thermal cells arranged in parallel with one another.

15. The method of claim 14 wherein the first thermal mass comprises more thermal cells than the second thermal mass which, in turn, comprises more thermal cells than the third thermal mass.

16. The method of claim 14 wherein each thermal cell comprises one or a combination of:
i) a packed bed of solid particles through which the heat transfer fluid can pass directly to carry thermal energy to and from the thermal energy storage device,
ii) a packed bed of solid particles arranged around at least one conduit through which the heat transfer fluid can pass,
iii) a solid mass matrix including a plurality of channels through which the heat transfer fluid can pass, or
iv) a volume of phase change material.

17. The method of claim 10 wherein each thermal cell comprises one or a combination of:
i) a packed bed of solid particles through which the heat transfer fluid can pass directly to carry thermal energy to and from the thermal energy storage device, and
ii) a packed bed of solid particles arranged around at least one conduit through which the heat transfer fluid can pass.

18. The method of claim 10, wherein the first, second and third thermal masses comprise solid particles and the diameter of the particles in at least two of the first, second and third thermal masses are different to one another.

19. The method of claim 10, wherein the first, second and third thermal masses comprise solid particles and the diameter of the particles in at least two of the first, second and third thermal masses are the same as one another.

20. The method of claim 10 wherein each thermal mass has a thermal capacity to conductivity ratio greater than 180 s/mm.

21. The method of claim 20 wherein each thermal mass has a thermal capacity to conductivity ratio greater than 500 s/mm.

22. The method of claim 10 wherein each thermal mass comprises rock.

23. The method of claim 11 wherein the step of charging the thermal energy storage device comprises directing the heat transfer fluid through the second and third thermal masses in parallel, and directing the heat transfer fluid through the first thermal mass in series with the second and third thermal masses.

24. The method of claim 10 wherein the thermal masses have different cross-sectional areas.

25. The method of claim 11 wherein the cross-sectional area of the third thermal mass is smaller than the cross-sectional area of the second thermal mass.

26. A method according to claim 11 wherein the flow rate of the heat transfer fluid through the thermal masses is increased during the step of discharging the further portion of the thermal energy.

27. A cryogenic energy storage system comprising:
the thermal energy storage device of claim 1, wherein the device is configured to store cold thermal energy released during power generation, and discharge the cold thermal energy to provide cold energy to liquefy cryogen and/or to provide cooling for co-located processes.

28. A cryogenic electricity generation system comprising:
the thermal energy storage device of claim 1, wherein the device is configured to store hot thermal energy from a source of waste heat, and discharge the hot thermal energy during electricity generation.

29. The thermal energy storage device of claim 1 wherein the heat transfer fluid comprises a gas or a liquid.

30. The thermal energy storage device of claim 1 wherein each of the thermal masses comprises a single thermal cell or a plurality of thermal cells arranged in parallel with one another.

31. The thermal energy storage device of claim 30 wherein the first thermal mass comprises more thermal cells than the second thermal mass which, in turn, comprises more thermal cells than the third thermal mass.

32. The thermal energy storage device of claim 30 wherein each thermal cell comprises one or a combination of:
   i) a packed bed of solid particles through which the heat transfer fluid can pass directly to carry thermal energy to and from the thermal energy storage device,
   ii) a packed bed of solid particles arranged around at least one conduit through which the heat transfer fluid can pass,
   iii) a solid mass matrix including a plurality of channels through which the heat transfer fluid can pass, or
   iv) a volume of phase change material.

33. The thermal energy storage device of claim 1 wherein each thermal cell comprises one or a combination of:
   i) a packed bed of solid particles through which the heat transfer fluid can pass directly to carry thermal energy to and from the thermal energy storage device, and
   ii) a packed bed of solid particles arranged around at least one conduit through which the heat transfer fluid can pass.

34. The thermal energy storage device of claim 1, wherein the first, second and third thermal masses comprise solid particles and the diameter of the particles in at least two of the first, second and third thermal masses are different to one another.

35. The thermal energy storage device of claim 1, wherein the first, second and third thermal masses comprise solid particles and the diameter of the particles in at least two of the first, second and third thermal masses are the same as one another.

36. The thermal energy storage device of claim 1 wherein each thermal mass has a thermal capacity to conductivity ratio greater than 180 s/mm.

37. The thermal energy storage device of claim 36 wherein each thermal mass has a thermal capacity to conductivity ratio greater than 500 s/mm.

38. The thermal energy storage device of claim 1 wherein each thermal mass comprises rock.

39. The thermal energy storage device of claim 1 wherein the thermal masses have different cross-sectional areas.

40. The thermal energy storage device of claim 9 wherein the cross-sectional area of the third thermal mass is smaller than the cross-sectional area of the second thermal mass.

41. The thermal energy storage device of claim 3 further comprising thermally insulating material to insulate each thermal mass.

* * * * *